US006222485B1

(12) United States Patent
Walters et al.

(10) Patent No.: US 6,222,485 B1
(45) Date of Patent: Apr. 24, 2001

(54) USE OF DESIRED ORIENTATION IN AUTOMOTIVE NAVIGATION EQUIPMENT

(75) Inventors: Thomas H. Walters, Gardner; Darin J. Beesley, Overland Park; Stephen C. Robinson, Olathe, all of KS (US)

(73) Assignee: Garmin Corporation (TW)

( * ) Notice: Subject to any disclaimer, the term of this patent is extended or adjusted under 35 U.S.C. 154(b) by 0 days.

(21) Appl. No.: 09/315,393

(22) Filed: May 20, 1999

(51) Int. Cl.$^7$ .................................................. H04B 7/185
(52) U.S. Cl. ................... 342/357.13; 701/208; 340/995; 342/419
(58) Field of Search .............................. 342/357.13, 419; 701/208; 340/995

(56) References Cited

U.S. PATENT DOCUMENTS

| | | | |
|---|---|---|---|
| 4,982,332 | * 1/1991 | Saito et al. | 340/995 |
| 5,161,886 | * 11/1992 | De Jong et al. | 340/995 |
| 5,204,817 | 4/1993 | Yoshida | 364/449 |
| 5,774,826 | * 6/1998 | McBride | 701/207 |
| 5,938,720 | * 8/1999 | Tamai | 701/209 |

* cited by examiner

Primary Examiner—Theodore M. Blum
(74) Attorney, Agent, or Firm—Shook, Hardy & Bacon, LLP

(57) ABSTRACT

A electronic navigation device utilizing a desired orientation to adjust an electronic map displayed on the device. Acquiring global positioning system data, a processor calculates the current position of the navigation device. Scanning into cartographic memory located in memory, the processor locates a predefined thoroughfare containing or most adjacent the calculated position. Utilizing points located nearest the calculated position, the processor establishes the heading of the thoroughfare at that location. The processor adjusts the orientation of the map display to reflect the calculated heading of the adjacent thoroughfare. The processor continues to update the current position and the heading of the map display on a real time basis.

10 Claims, 7 Drawing Sheets

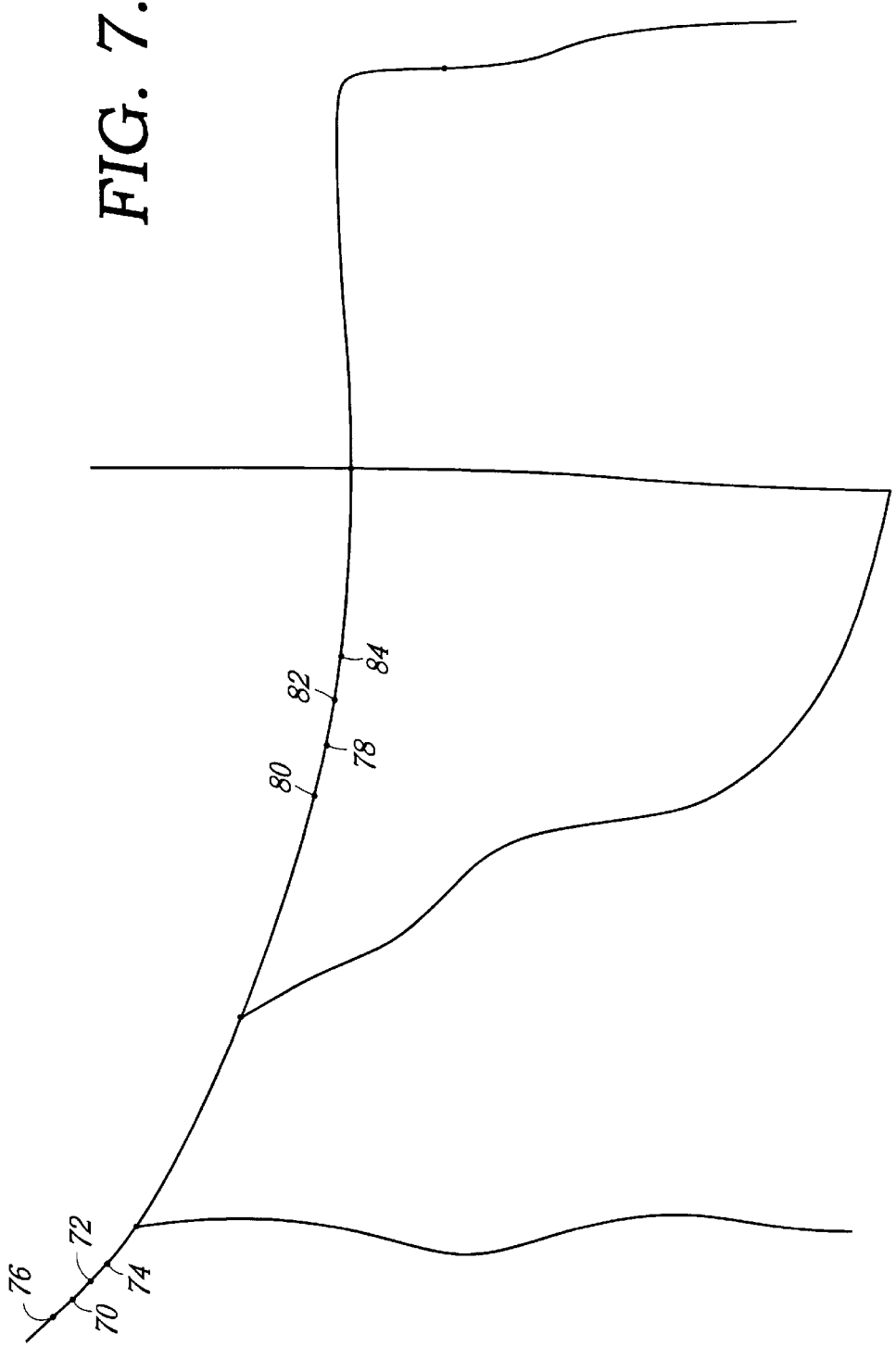

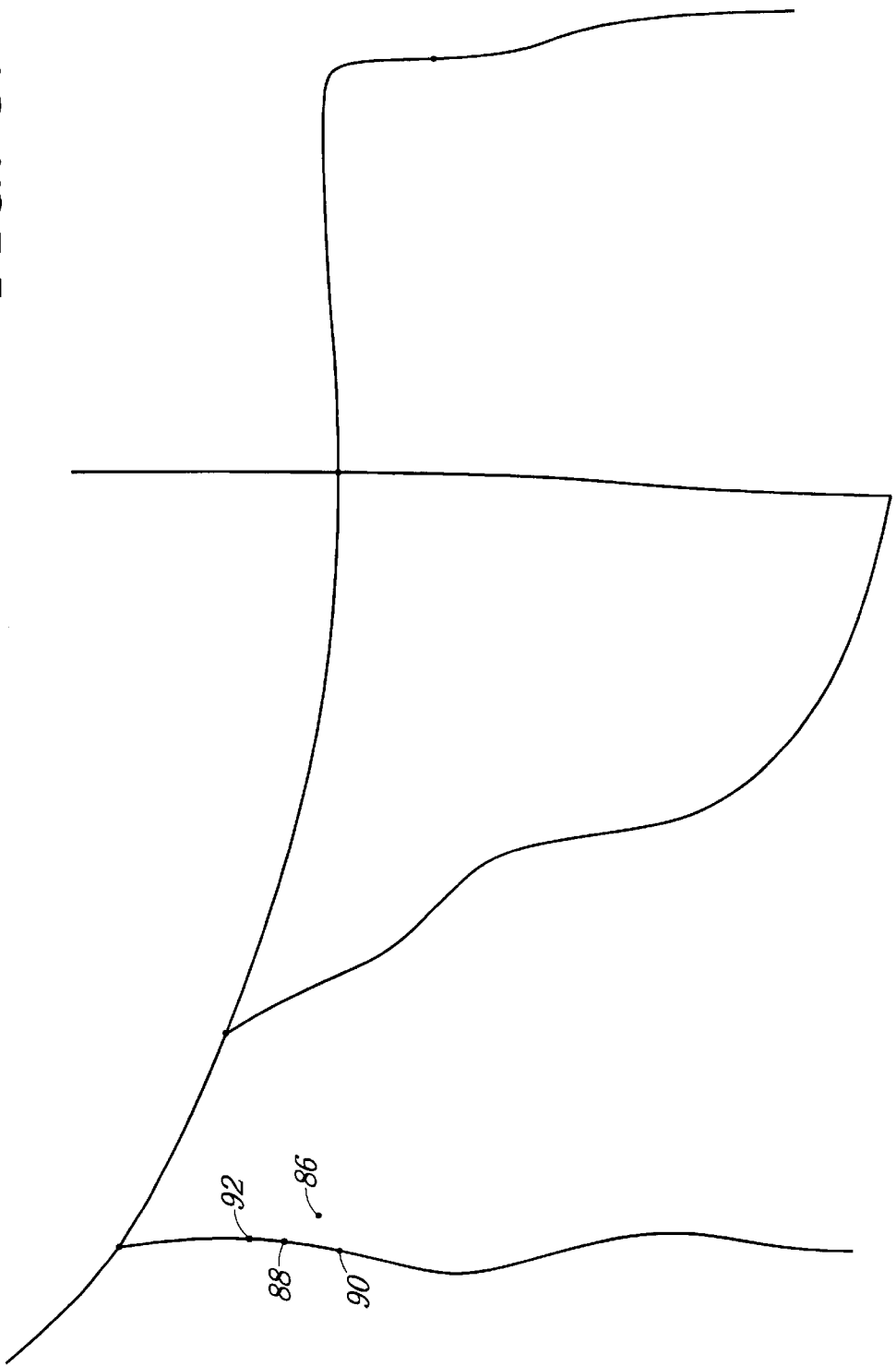

USE OF DESIRED ORIENTATION IN AUTOMOTIVE NAVIGATION EQUIPMENT

BACKGROUND OF THE INVENTION

1. Field of the Invention

In general, this invention relates to automotive navigational mapping equipment and, more specifically, to a map display which utilizes a locking desired heading to control the orientation of an electronic map.

2. Description of the Related Art

Automotive navigational equipment utilizing map displays are common in the field of electronic navigation equipment. In general, these devices display a map of a desired area for a driver to reference while driving or planning a route. All such systems must implement some criteria for determining the orientation of the displayed map.

Some prior art systems always display the map heading north at the top of the electronic map display. These prior art systems may be useful in displaying an absolute direction of travel, but can become difficult to interpret while a vehicle is in motion. In such a situation, the user has to first locate the position of the vehicle on the map, determine the current direction the vehicle is traveling, and then reference the direction relative to the map display.

Some other types of navigational systems utilize positioning sensors, such as Global Positioning Systems (GPS antenna/receivers), to constantly calculate a vehicle's direction and use this calculated direction as the top of the display. Because some GPS systems become inaccurate at low speeds, the inaccuracies can cause the map display to shift erratically, confusing and annoying the driver attempting to read the map directions. In addition, since most turns from one road onto another occur at low velocity, the shifting of the map can become extremely disorienting to the driver at a time when it is most needed.

Some known prior art systems have attempted to remedy these problems by incorporating a desired heading, or desired track, to fix the orientation of the map display. This desired track method locates the general directional heading of the entire route and fixes that direction as top of the display for the entire trip. However, this method can become difficult to use, especially when there are multiple heading changes along a route. For example, in planning a route, the general direction of the entire route may be east. According to the prior art desired track method, the map display would be orientated so that east would always be at the top of the display. If the route being taken is generally straight east, the desired heading method generally serves its purpose. The desired track becomes disorientating, however, if the route changes direction either as multiple thoroughfares are traversed or just change in thoroughfare direction. In this scenario, east might be displayed as top while the vehicle may be traveling a different direction, thereby eliminating the usefulness of a desired track heading.

There exists a need for a map heading display which determines a map orientation that is useful in accommodating the relative current direction of a vehicle without being inaccurate and unsteady at low speeds and which is able to account for variations in the direction of travel along a desired route.

SUMMARY OF THE INVENTION

Based on the above mentioned deficiencies in the related art, it is an object of the present invention to provide a map heading display that can display a vehicle's current relative direction as the top of a map display.

It is a further object of the present invention to provide a map heading display which is accurate and steady at low speed.

Finally, it is an object of the present invention to provide a map heading display that can account for directional change along a route.

These and other objects of the present invention are achieved by a map display which utilizes a locking desired heading to fix a map orientation. In this system, the map display device includes a processor, a memory containing cartographic data encompassing a desired route and an input device capable of determining a vehicle's current location. Based on the cartographic data in memory, the processor graphically represents this data as a map on the display. In deciding which orientation the displayed map should have, the processor first calculates the vehicle's current location by sampling global positioning system data through an antenna/receiver. Using the vehicle's calculated two dimensional coordinates, the processor scans the cartographic data in memory to determine whether a preestablished thoroughfare corresponds to the vehicle's coordinates. If so, the processor uses the adjacent points within that thoroughfare to calculate the thoroughfare's direction. The processor sets the calculated thoroughfare direction as the desired heading orientation and adapts the display so as to make the desired heading the top of the heading.

If there is no corresponding thoroughfare for the vehicle's calculated position, the processor scans the cartographic data in memory to determine a thoroughfare most adjacent to the vehicle's current location. The processor uses the nearby points of the adjacent thoroughfare to calculate the thoroughfare's direction. The processor sets the calculated thoroughfare direction as the desired heading orientation and adjusts the display so as to make the desired heading the top of the display. The processor continues to monitor the vehicle's position and will update the map display as the thoroughfare changes direction.

Those, as well as other novel advantages, details, embodiments, features, and objects of the present invention, will be apparent to those skilled in the art from the following detailed description of the invention, the attached claims and accompanying drawings, listed herein below, which are useful in explaining the invention.

BRIEF DESCRIPTION OF THE DRAWINGS

The objects and features of the invention noted above are explained in more detail with reference to the drawings, in which like reference numerals denote like elements, and in which:

FIG. 7 is a representation of the heading calculation utilized by the portable electronic device of the present invention; and FIG. 8 is a representation of the heading calculation utilized by the portable electronic device of the present invention.

DETAILED DESCRIPTION OF THE INVENTION

A better understanding of the present invention reference may be had to the following detailed description taken in conjunction with dependant claims and accompanied drawings. In essence, the present invention enables an electronic navigation device for a vehicle to display the vehicle's desired heading at the top of a graphical, electronic representation of a map. The navigation device displays a vehicle's desired heading at the top of a display by determining the vehicle's current location with global positioning system data (GPS) and setting the desired heading as the direction of the thoroughfare being traversed by the vehicle or most closely adjacent to the vehicle.

Figure 1:
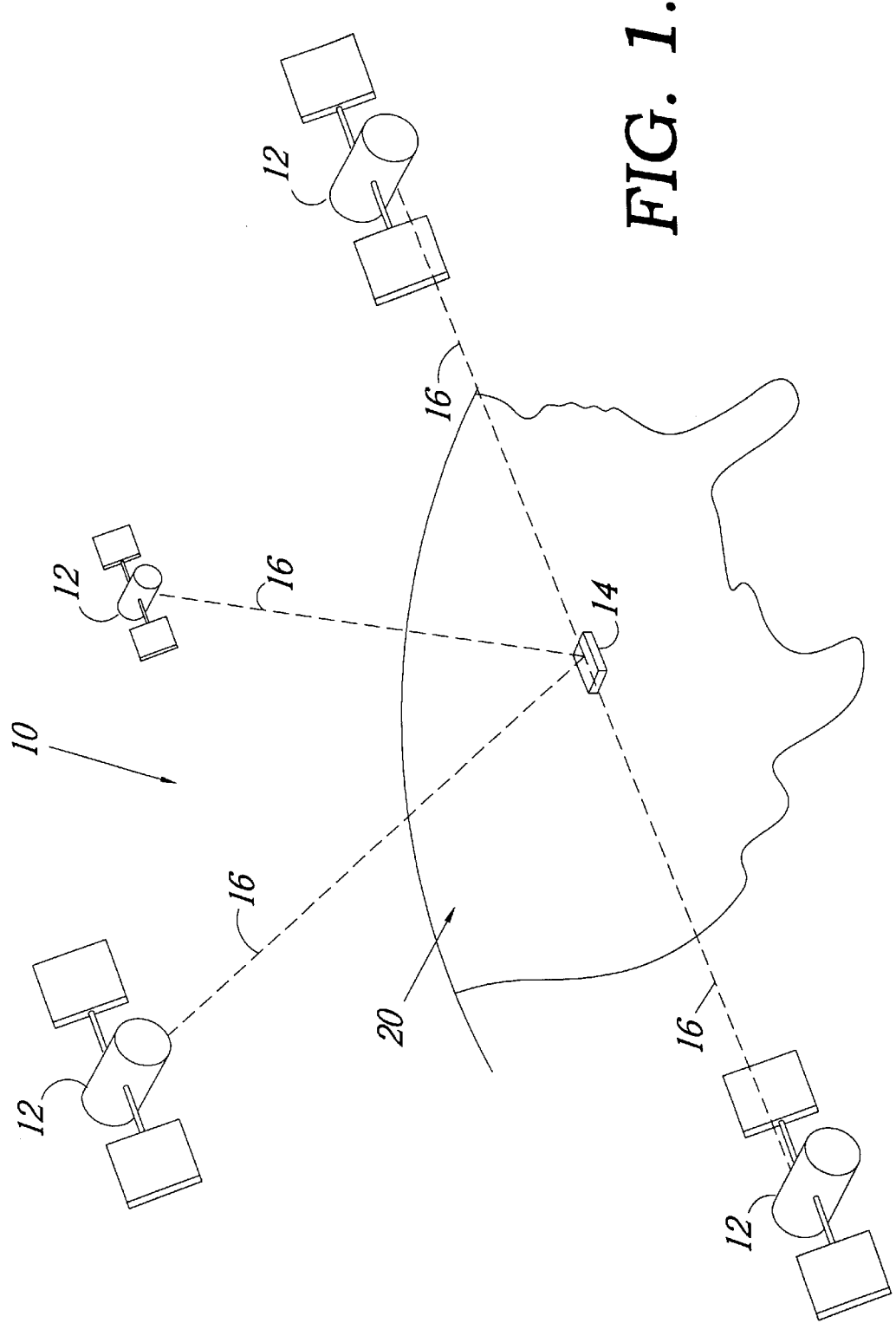
FIG. 1 is a representative of a GPS system.

FIG. 1 is representative of a GPS system denoted generally by reference numeral 10. A plurality of satellites 12 are in orbit about the Earth 20. The orbit of each satellite 12 is not necessarily synchronous with the orbits of other satellites 12 and, in fact, is likely asynchronous. A GPS receiver device 14 of the present invention is shown receiving spread spectrum GPS satellite signals 16 from the various satellites 12.

The spread spectrum signals 16 continuously transmitted from each satellite 12 utilizes a highly accurate frequency standard accomplished with an extremely accurate atomic clock. Each satellite 12, as part of its data signal transmission 16, transmits a data stream indicative of that particular satellite 12. It will be appreciated by those skilled in the relevant art that the GPS receiver device 14 must acquire spread spectrum GPS satellite signals 16 from at least three satellites 12 for the GPS receiver device 14 to calculate its two-dimensional position by triangulation. Acquisition of an additional signal 16, resulting in signals 16 from a total of four satellites 12, permits GPS receiver device 14 to calculate its three-dimensional position.

Figure 2:
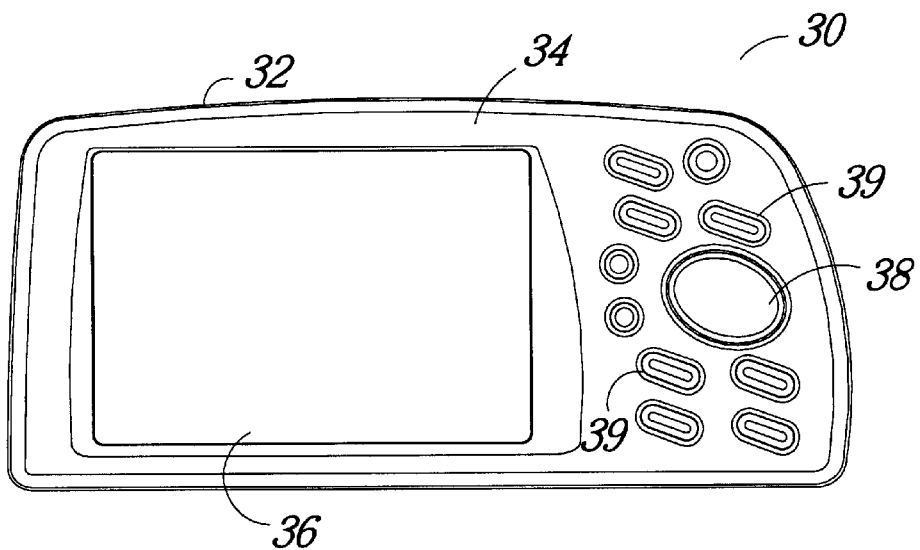
FIG. 2 is a front elevational view of the portable electronic navigation device of the present invention.
Figure 3:
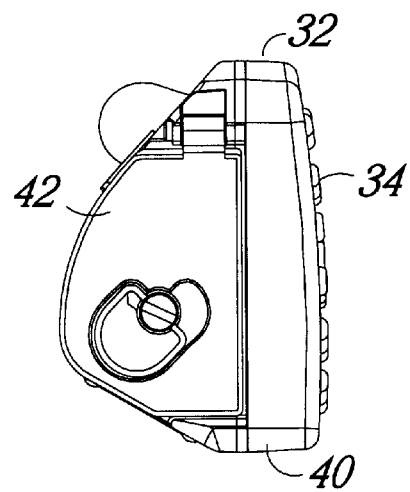
FIG. 3 is a side elevational view of the portable electronic navigation device of the present invention.

FIGS. 2 and 3 denote an elevational view of the portable electronic navigational device of the present invention, which is denoted generally by reference numeral 30. The navigational device has a generally rectangular housing 32 which is constructed of resilient material and has been mounted for aesthetic purposes. The device's housing 32 is defined by an outer front case 42 and a rear case 44 with the front case 42 defined by a control face 34. The control face 34 has access slots for input key pad 38, which is individual keys 40, and a display screen 36. The display screen 36 is a LCD display which is capable of explaining both text and graphical information. The outer front case 42 and rear case 44 are made of one molded piece interconnecting to form the device housing 32 and support input key pad 38 and display screen 36 in the respective access slots in the control face 34.

Figure 4:
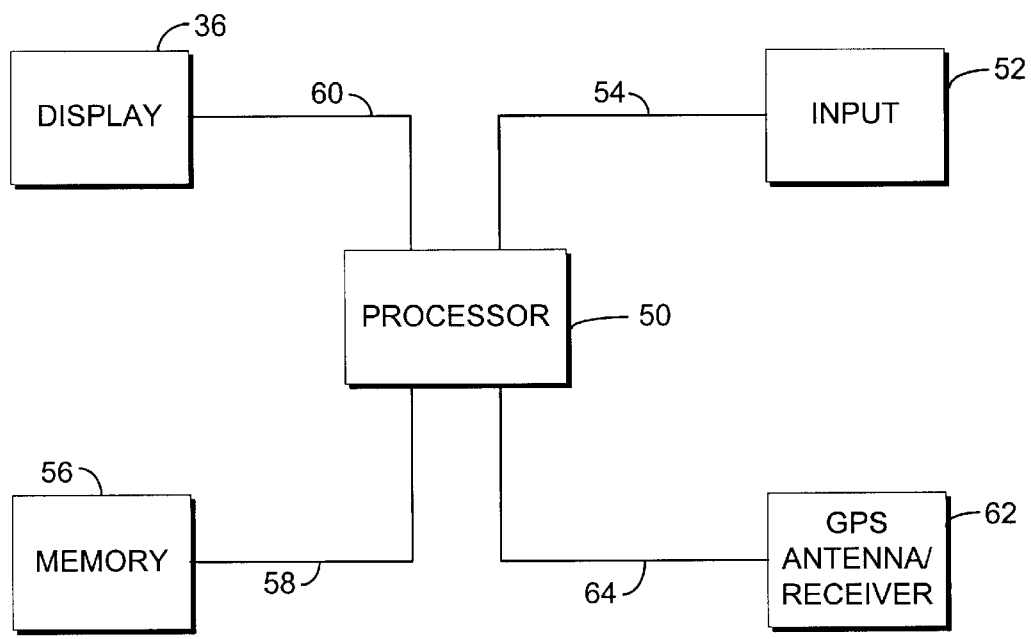
FIG. 4 is a block diagram of the components of the portable electronic navigation device of the present invention.

FIG. 4 is a block diagram of the electronic components within the housing 32 utilized by the portable electronic navigational device 30. The electronic circuit includes a processor 50 which is connected to input 52 via line 54. Processor 50 communicates with memory 56 via line 58. Processor 50 also communicates with display screen 36 via line 60. GPS antenna/receiver 62 is connected to processor 50 via line 64. The electronic circuitry is powered by a power source (not shown) in a conventional manner. As would be understood, different configurations of these components would be considered within the scope of the present invention.

Figure 5:
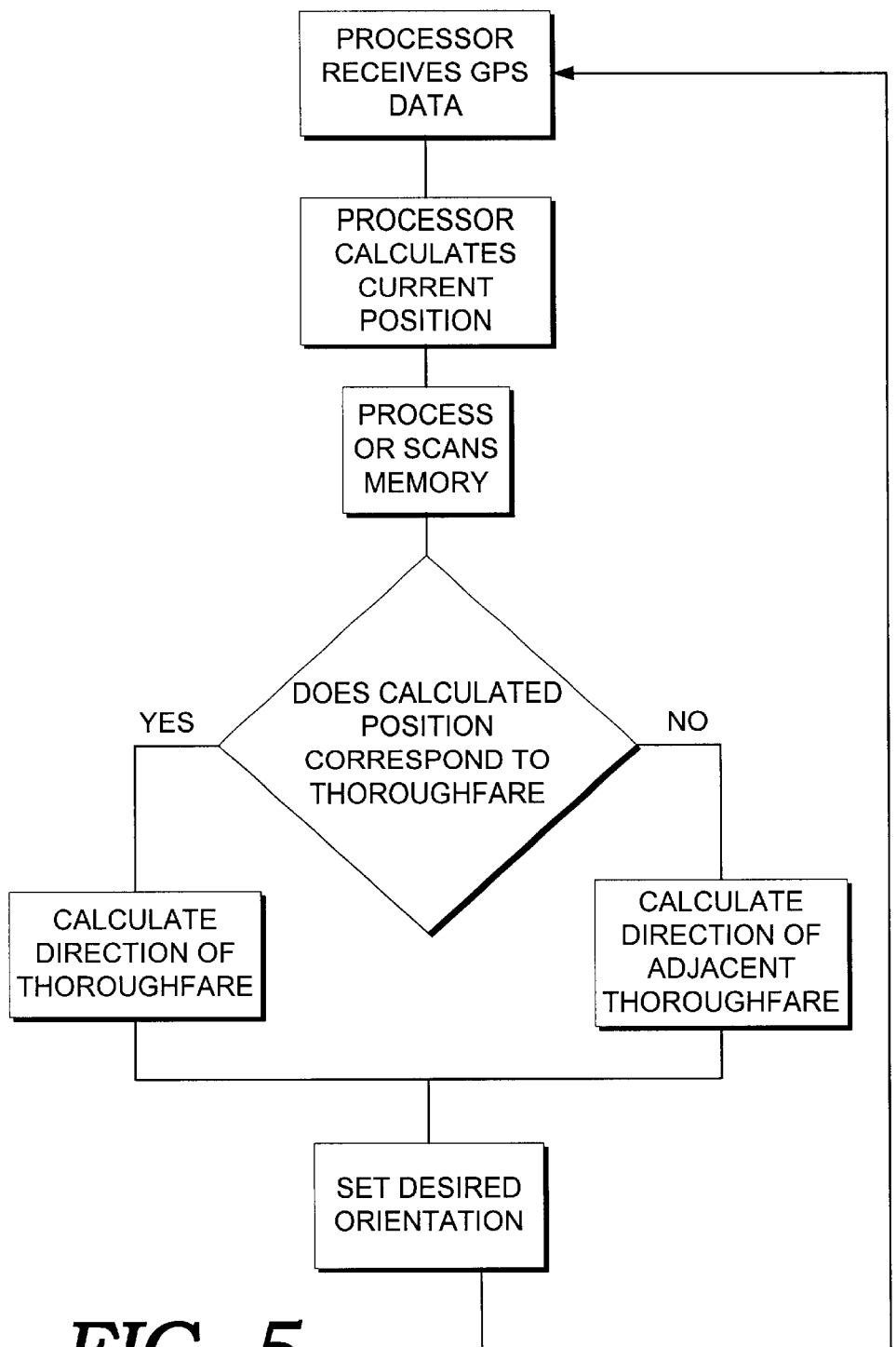
FIG. 5 is a flow diagram of the is a flow diagram of the system processes implemented by the portable electronic navigation device of the present invention.

FIG. 5 is a flow diagram of the desired heading calculation method implemented by the portable navigational device 30. Processor 50 samples input data from GPS receiver antenna 62 as represented by Step S510. Utilizing the GPS data processor 50 calculates the device's 30 current position in cartographic coordinates in Step S520. In Step S530, processor 50 scans memory 56 which contains cartographic data indicative of the thoroughfares contained within the particular geographic area in which device 30 is located. Processor 50 determines in Step S540 whether the calculated coordinates of the device correspond to the cartographic coordinates of a preestablished thoroughfare in memory 56. If so, processor 50 calculates the direction of the thoroughfare corresponding to the calculated coordinates in Step S550.

In the preferred embodiment, the cartographic data is stored as separate X and Y coordinate data in memory 56. Processor 50 recalls the adjacent coordinates along the predefined thoroughfare as described in a pending patent application for Geographic Coordinate Data Storage, Ser. No. 08/904,642 and incorporated by reference herein. Utilizing the current calculated position of device 30 and the adjacent points along the preestablished thoroughfare, processor 50 calculates the heading of the thoroughfare at that particular location. Upon calculating the current heading of the thoroughfare in Step S550, processor 50 designates the current heading of the thoroughfare as the desired orientation of the electronic map display in Step S560.

As an alternative to Step S540, if the calculated coordinates of the navigation unit 30 do not correspond to a preestablished thoroughfare stored in memory 56, processor 50 calculates the desired heading by calculating the direction of a thoroughfare most adjacent to the calculated position in Step S570. In the preferred embodiment, processor 50 locates the coordinates of a preestablished thoroughfare most adjacent to the calculated position. Similar to Step S550, after identifying a corresponding thoroughfare, processor 50 recalls the adjacent points along the thoroughfare and calculates the heading of the thoroughfare. Upon calculating the current heading of the thoroughfare in Step S570, processor 50 designates the current heading of the thoroughfare as the desired orientation of the electronic map display in Step S560.

After assigning the desired orientation of the map display in Step S560, processor 50 repeats the entire process. In the preferred embodiment, the process is repeated at periodic intervals to ensure that the current heading of the navigation unit is updated on a real time basis. As would be understood, the process could be updated at multiple intervals, upon a user initiative or upon the happening of a specific event. All such alternatives would be considered within the scope of the present invention.

Figure 6:
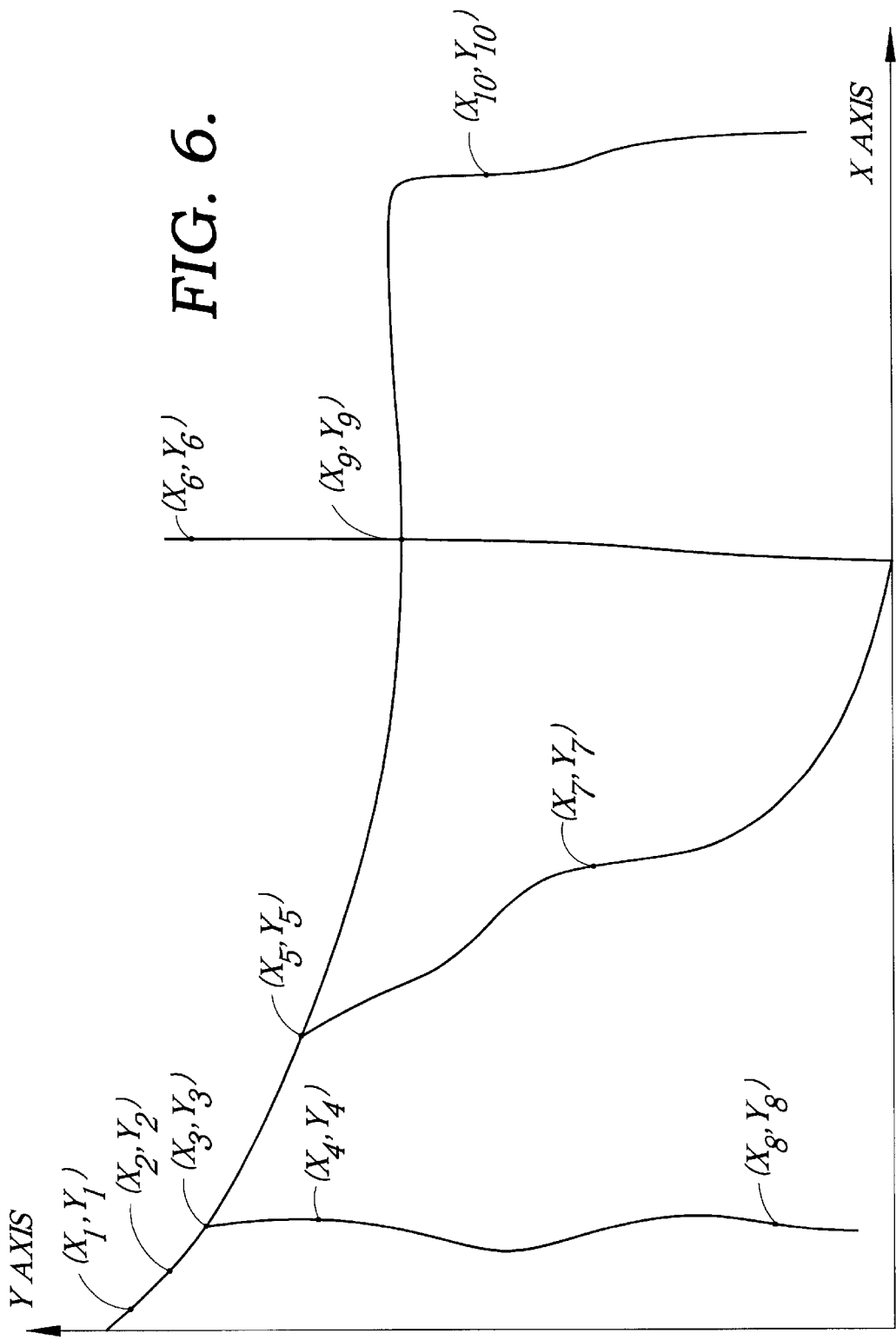
FIG. 6 is a representation of the cartographic data utilized by the portable electronic devicse of the present invention.

FIG. 6 is representative of a cartographic map divided into two-dimensional X and Y coordinates. As demonstrated by FIG. 6, every thoroughfare is defined as a grouping of coordinate points which have separate X and Y coordinates. The construction of the cartographic data into X and Y coordinates is typically done during the software development stage and is normally included with the prestored cartographic data. By constructing each thoroughfare by cartographic coordinates, processor 50 stores in memory 56 each point along a particular thorough and sets of points adjacent to each point.

FIGS. 7 and 8 are representative of a cartographic map implementing the desired heading up method of the present invention. In FIG. 7, processor 50 receives the GPS data from GPS antenna/receiver 62 and calculates the navigation device's 30 current position designated generally 70. Processor 50 queries the cartographic data in memory 56 and determines that the calculated position 70 is located on an predefined thoroughfare. Processor 50 recalls from memory 56 points located on thoroughfare which are adjacent to the calculated position 70. In this example, processor 50 would locate adjacent points 72, 74 and 76. Utilizing calculated position 70 and adjacent points 72, 74 and 76, processor 50 calculates a heading of the thoroughfare. In this example, the calculated heading would reflect a southeast direction. Processor 50 sets southeast as the desired orientation of the electronic map.

With reference again to FIG. 7, at some point later along the route, processor 50 calculates a new current vehicle position, designated generally 78. Processor 50 queries the cartographic data in memory 56 and determines that point 78 is located on a predefined thoroughfare, in this example, the same thoroughfare as before. Processor recalls from memory 56 points located on the thoroughfare which are adjacent to the new calculated position 78. In this example, processor 50 would locate adjacent points 80, 82 and 84. Utilizing calculated position 78 and adjacent points 80, 82, and 84, processor 50 calculates a heading of the thoroughfare. In this example, the calculated heading would reflect a east direction. Processor 50 sets east as the desired orientation of the electronic map.

With specific reference to FIG. 8, processor 50 can also calculate a desired heading when the calculated position does not correspond directly to an established thoroughfare in the cartographic data. In this scenario, processor 50 calculates the current position 86 of the navigation device 30 utilizing acquired GPS data. Processor 50 polls the cartographic data in memory 56 and does not find a corresponding thoroughfare that contains the calculated position. To determine the desired heading, processor 50 locates a predefined thoroughfare adjacent the calculated position 86 and recalls points along the adjacent thorough most near the calculated position 86. In this scenario, processor 50 would recall points 88, 90, and 92. Utilizing adjacent thoroughfare points 88, 90 and 92, processor 50 calculates a heading of the thoroughfare. In this scenario, the calculated heading would reflect a north direction. Processor 50 sets north as the desired orientation of the electronic map to north.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. An electronic navigation device for a vehicle, said device comprising:

a processor;

a memory in communication with said processor, said memory having cartographic data, wherein said cartographic data includes one or more thoroughfares; and a display, wherein said display displays said cartographic data, wherein said processor retrieves from said memory, data corresponding to one or more thoroughfares and determines a desired orientation for display of said cartographic data based upon a current location of said vehicle, a direction of travel of said vehicle, and a direction of at least one of said one or more thoroughfares corresponding to said current vehicle location, wherein said direction of said at least one of said one or more thoroughfares is determined from said retrieved cartographic data.

2. The navigation device as set forth in claim 1, wherein said current vehicle location has corresponding cartographic coordinates and said one or more thoroughfares has corresponding cartographic coordinates.

3. The navigation device as set forth in claim 2, wherein said one of said one or more thoroughfares is a thoroughfare most closely associated with said current vehicle location cartographic coordinates.

4. The navigation device as set forth in claim 3, wherein said closely associated thoroughfare is a thoroughfare lying on said current vehicle location cartographic coordinates.

5. The navigation device as set forth in claim 3, wherein said closely associated thoroughfare is a thoroughfare lying adjacent to said current vehicle location cartographic coordinates.

6. An electronic map orientation method for a portable navigation device in a vehicle having a processor, a memory having cartographic data that includes one or more thoroughfares, and a display, the method comprising:

obtaining a current location of said vehicle;

determining a direction of travel of said vehicle;

retrieving data corresponding to a direction of one of said one or more thoroughfares corresponding to said current vehicle location, wherein said direction of said one of said one or more thoroughfares is determined from said cartographic data; and establishing an orientation of said display, based upon said retrieved data, corresponding to the direction of said one of said one or more thoroughfares.

7. The method as recited in claim 6, wherein said obtaining said current vehicle location includes receiving global positioning data corresponding to said current vehicle location.

8. The method as recited in claim 6, wherein said current vehicle location has corresponding cartographic coordinates and said one or more thoroughfares has corresponding cartographic coordinates.

9. The method as recited in claim 8, wherein said one of said one or more thoroughfares is a thoroughfare lying on said current vehicle cartographic coordinates.

10. The method as recited in claim 8, wherein said one of said one or more thoroughfares is a thoroughfare lying adjacent to said current vehicle cartographic coordinates.

* * * * *